United States Patent [19]

Banno et al.

[11] Patent Number: 4,708,982

[45] Date of Patent: Nov. 24, 1987

[54] CURED UNSATURATED POLYESTER RESIN OR VINYL ESTER RESIN CONTAINING FLUORINE-CONTAINING GROUPS ORIENTED ON ITS SURFACE

[75] Inventors: Shigeki Banno; Yoshihiro Oshibe; Yoshimasa Nakagawa, all of Aichi, Japan

[73] Assignee: Nippon Oil and Fats Co., Ltd., Japan

[21] Appl. No.: 782,397

[22] Filed: Oct. 1, 1985

[30] Foreign Application Priority Data

Oct. 29, 1984 [JP] Japan .................................. 59-225662

[51] Int. Cl.$^4$ ........................ C08L 67/06; C08L 63/10
[52] U.S. Cl. ......................................... 525/92; 525/88
[58] Field of Search ................... 525/92, 169, 88, 92, 525/88

[56] References Cited

U.S. PATENT DOCUMENTS 2,497,046  2/1950  Kropa .................................. 525/169
3,674,893  7/1972  Nowak .................................. 525/92

Primary Examiner—Patricia A. Short
Attorney, Agent, or Firm—Parkhurst & Oliff

[57] ABSTRACT

A cured unsaturated polyester resin or vinyl ester resin having excellent water resistance, weather resistance, stain resistance and anti-block property can be obtained by curing an unsaturated polyester resin or vinyl ester resin together with a fluorine-containing block copolymer consisting of a polymer portion having fluorine-containing groups and a polymer portion compatible with the unsaturated polyester resin or vinyl ester resin.

3 Claims, No Drawings

CURED UNSATURATED POLYESTER RESIN OR VINYL ESTER RESIN CONTAINING FLUORINE-CONTAINING GROUPS ORIENTED ON ITS SURFACE

BACKGROUND OF THE INVENTION

The present invention relates to a cured unsaturated polyester resin or vinyl ester resin containing fluorine-containing groups oriented on its surface, which is obtained by curing an unsaturated polyester resin or vinyl ester resin together with a block copolymer consisting of a polymer portion having fluorine-containing groups and a polymer portion compatible with the unsaturated polyester resin or vinyl ester resin.

Unsaturated polyester resin or vinyl ester resin has ester linkages in its molecule, and hence the resin has high affinity to water and hence has high water absorption. Therefore, shaped articles of the unsaturated polyester resin or vinyl ester resin are poor in water resistance and weather resistance due to the hydrolysis of the ester linkages.

Unsaturated polyester resin and vinyl ester resin are used as a matrix of reinforced plastic articles and have strength and beautiful appearance. Therefore, the resins are widely used in bathtub, automotive body, ship, computer housing and the like. However, unsaturated polyester resin or vinyl ester resin used in the automotive body or bathtub is deteriorated due to the adhesion of fur or to the hydrolysis of the resin caused by the action of water for a long period of time. The resin used in the automotive body or computer housing is stained due to the adhesion of oil, pitch, aqueous and oily writing materials, adhesion tape and the like.

There have been proposed several methods in order to solve the above described various problems. For example, when the hardened degree of a cured unsaturated polyester resin or vinyl ester resin is increased in order to decrease the remaining monomer (for example, styrene) into a very small amount, the water resistance, weather resistance and corrosion resistance of the resin are improved. This method is an ordinarily used method.

Further, Reinforced Plastics (Japan), Vol. 26, pages 425–434 (1980) discloses that a reinforced plastic corrugated plate consisting of an unsaturated polyester resin and glass fibers is overlaid with a fluorine-containing polymer film to improve the weather resistance of the plate.

However, it is commonly known that the water resistance, weather resistance and stain resistance of unsaturated polyester resin or vinyl ester resin depend upon the chemical structure of the resin itself. Accordingly, merely the increasing of the hardened degree of the resin cannot serve to improve significantly the water resistance, weather resistance, stain resistance and the like of these resins.

On the contrary, the above described method of overlaying a fluorine-containing polymer film on an unsaturated polyester resin or vinyl ester resin can give properties, such as water resistance, weather resistance, stain resistance, anti-block property, water repellency, oil repellency and the like, to the resin. The reason is that the bonding force of a fluorine atom to a carbon atom in the fluorine-containing polymer is high, and the polarizability of fluorine atom is small, and accordingly the cohesive force between fluorine-containing polymer molecules is small and further the surface tension of the fluorine-containing polymer is very low.

However, the overlaying method has a serious problem in that a fluorine-containing polymer film overlaid on an unsaturated polyester resin or vinyl ester resin is not so strongly bonded to the resin. That is, the fluorine-containing polymer film is poorly adhered to the unsaturated polyester resin or vinyl ester resin, and the fluorine-containing polymer film may be peeled off from the unsaturated polyester resin or vinyl ester resin during the use for a long period of time of the resin overlaid with the polymer film, and the above described properties of the resin overlaid with the polymer film are lost.

Further, the poor adhesion of the fluorine-containing polymer film to the unsaturated polyester resin or vinyl ester resin causes a high fraction of defective products in the production of unsaturated polyester resins or vinyl ester resins overlaid with the fluorine-containing polymer film.

Conventional methods for improving the water resistance, weather resistance, stain resistance and the like of unsaturated polyester resin or vinyl ester resin by the use of a fluorine-containing polymer still have the above described various drawbacks.

The inventors have made various investigations in order to improve the water resistance, weather resistance, stain resistance, water repellency, oil repellency and the like of unsaturated polyester resin or vinyl ester resin, and have ascertained that the above described drawbacks of conventional methods can be solved by a method, wherein an unsaturated polyester resin or vinyl ester resin is cured together with a block copolymer consisting of a polymer portion having fluorine-containing groups and a polymer portion compatible with the unsaturated polyester resin or vinyl ester resin, to orient the polymer portion having fluorine-containing groups on the surface of the resin. As the result, the inventors have accomplished the present invention.

SUMMARY OF THE INVENTION

The feature of the present invention lies in the provision of a cured unsaturated polyester resin or vinyl ester resin containing fluorine-containing groups oriented on its surface, which is obtained by curing an unsaturated polyester resin or vinyl ester resin together with a block copolymer consisting of a polymer portion having fluorine-containing groups and a polymer portion compatible with the unsaturated polyester resin or vinyl ester resin, while contacting the resin with air or with a fluorine-containing polymer.

DESCRIPTION OF THE PREFERRED EMBODIMENT

The unsaturated polyester resin to be used in the present invention is a mixture of a prepolymer having ester linkages and having radically polymerizable double bonds, and a radically polymerizable monomer. For example, a mixture of a prepolymer, which is obtained by polycondensing a dicarboxylic acid, for example, phthalic acid or fumaric acid, together with a glycol, for example propylene glycol, and has a molecular weight of 1,000–6,000, and styrene as the monomer.

However, in the present invention, any unsaturated polyester resins can be used independently of their composition and components.

The vinyl ester resin to be used in the present invention is a resin which may be called an epoxy acrylate resin. That is, the vinyl ester resin is a resin obtained by bonding epoxy group or glycidyl group of epoxy resin and the like with a radically polymerizable unsaturated carboxylic acid, such as acrylic acid, methacrylic acid or the like, through an esterification reaction. The vinyl ester resin may be used in the form of a mixture of the resin with a radically polymerizable monomer.

In the present invention, the composition and components of the vinyl ester resin are not particularly important.

The polymer portion having fluorine-containing groups in the fluorine-containing block copolymer to be used in the present invention is a polymer of at least one of fluorine-containing vinyl monomers, for example, having the following general formulae (I)–(VI). However, since the effect of the present invention appears due to the presence of fluorine-containing groups oriented on the cured resin surface, the polymer portion having fluorine-containing groups in the block copolymer of the present invention is not limited to the polymers of the fluorine-containing vinyl monomers having the general formulae (I)–(VI).

The fluorine-containing vinyl monomers include
a fluorine-containing vinyl monomer having the general formula (I)

$$CH_2=CR_1COOR_2R_{f1} \quad (I)$$

wherein $R_1$ represents a hydrogen atom or a $-CH_3$ group; $R_2$ represents a straight chain or branched $-C_mH_{2m}-$ group (wherein m is a positive integer of 1–10); and $R_{f1}$ represents a $-C_nF_{2n+1}$ or $-C_nF_{2n-1}$ group (wherein n is a positive integer of 1–16), a fluorine-containing vinyl monomer having the general formula (II)

$$CH_2=CR_1COOR_3R_4 \quad (II)$$

wherein $R_1$ has the same meaning as in the general formula (I); $R_3$ represents a $-C_kH_{2k}\text{-}(CH_2CH_2O)_l$ group (wherein k is 0 or a positive integer of 1–10, and l is a positive integer of 1–10); and $R_4$ represents a $-C_pH_{2p}C_qF_{2q}H$ group (wherein p is 0 or a positive integer of 1–10, and q is a positive integer of 1–10), a fluorine-containing vinyl monomer having the general formula (III)

$$CH_2=CR_1COOR_2R_{f2} \quad (III)$$

wherein $R_1$ and $R_2$ have the same meanings as in the general formula (I); and $R_{f2}$ represents a $-C_rF_{2r-2}H$, $-C_rF_{2r+1}$ or $-C_rF_{2r}H$ group (wherein r is a positive integer of 1–10), a fluorine-containing vinyl monomer having the general formula (IV)

$$CH_2=CR_5COOR_6 \quad (IV)$$

wherein $R_5$ represents a fluorine atom or a $-CHF_2$, $-CH_2F$, $-CF_3$, $-OCOCH_2F$ or $-O\text{-}COCHF_2$ group; and $R_6$ represents a $-C_nH_{2n+1}$, $-C_nH_{2n}F$, $-C_nF_{2n+1}$ or $-C_nF_{2n}H$ group (wherein n is a positive integer of 1–16), a fluorine-containing vinyl monomer having the general formula (V)

wherein $R_1$, $R_2$ and $R_{f1}$ have the same meanings as in the general formula (I); and $R_7$ represents a $-C_mH_{2m+1}$ group (wherein m is a positive integer of 1–10), and a fluorine-containing vinyl monomer having the general formula (VI)

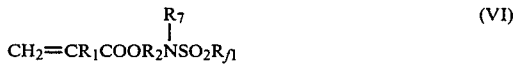

wherein $R_1$, $R_2$ and $R_{f1}$ have the same meanings as in the general formula (I) and $R_7$ has the same meaning as in the general formula (V).

The fluorine-containing vinyl monomer having the general formula (I) includes $CF_3(CF_2)_7CH_2CH_2OCOCH=CH_2$,
$CF_3(CF_2)_4CH_2CH_2OCOC(CH_3)=CH_2$, $CF_3CH_2OCOCH=CH_2$,

and the like.

The fluorine-containing vinyl monomer having the general formula (II) includes $CF_3CH_2OCH_2CH_2OCOCH=CH_2$,
$HCF_2CF_2OCH_2CH_2OCOCH=CH_2$,
$C_2F_5(CH_2CH_2O)_2CH_2OCOCH=CH_2$,
$C_8F_{17}OCH_2CH_2OCOC(CH_3)=CH_2$,

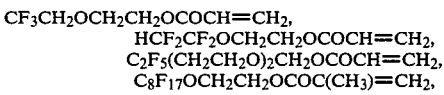

$CF_3(CF_2)_4OCH_2CH_2OCOC(CH_3)=CH_2$,

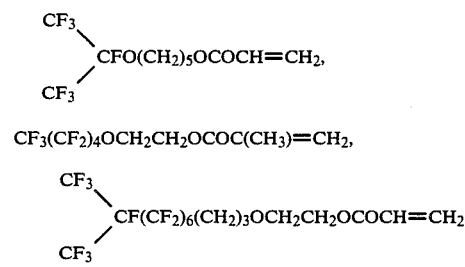

and the like.

The fluorine-containing vinyl monomer having the general formula (III) includes

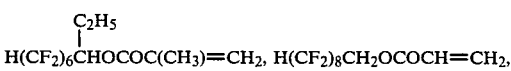

-continued

H(CF$_2$)$_4$CH$_2$OCOCH=CH$_2$, H(CF$_2$)$_6$CH$_2$OCOC(CH$_3$)=CH$_2$,
CF$_3$(CF$_2$)$_5$CH$_2$OCOCH=CH$_2$,

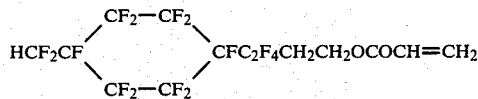

and the like.

The fluorine-containing vinyl monomer having the general formula (IV) includes

CH$_3$OCOCF=CH$_2$, FCH$_2$CH$_2$OCOCF=CH$_2$,
C$_2$H$_5$OCOC(CH$_2$F)=CH$_2$, CH$_3$OCOC(CHF$_2$)CH$_2$,
C$_3$H$_7$OCOC(CF$_3$)=CH$_2$, CH$_3$OCOC(OCOCH$_2$F)=CH$_2$,
C$_2$H$_5$OCOC(OCOCH$_2$F)=CH$_2$, C$_8$H$_{17}$OCOC(CF$_3$)=CH$_2$,
C$_8$F$_{17}$OCOC(OCOCH$_2$F)=CH$_2$, HC$_3$F$_6$OCOCF=CH$_2$ and the like.

The fluorine-containing vinyl monomer having the general formula (V) includes

C$_7$F$_{15}$CON(C$_2$H$_5$)CH$_2$OCOC(CH$_3$)=CH$_2$,

C$_2$F$_5$CON(C$_2$H$_5$)CH$_2$OCOCH=CH$_2$,

CF$_3$(CF$_2$)$_2$CON(CH$_3$)CH(CH$_3$)CH$_2$OCOCH=CH$_2$,

CF$_3$(CF$_2$)$_7$CON(CH$_2$CH$_2$CH$_3$)CH$_2$CH$_2$OCOC(CH$_3$)=CH$_2$ and the like.

The fluorine-containing vinyl monomer having the general formula (VI) includes

CF$_{33}$(CF$_2$)$_7$SO$_2$N(CH$_3$)CH$_2$CH$_2$OCOC(CH$_3$)=CH$_2$,

CF$_3$(CF$_2$)$_7$SO$_2$N(CH$_3$)CH$_2$CH$_2$OCOCH=CH$_2$,

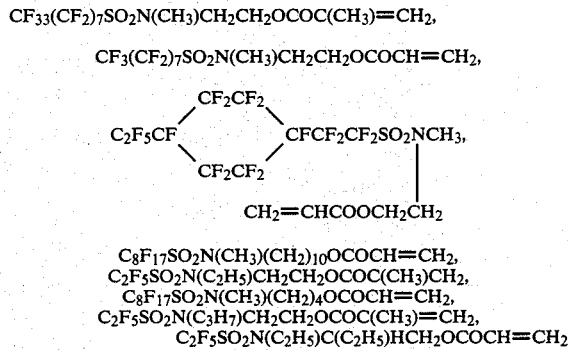

C$_8$F$_{17}$SO$_2$N(CH$_3$)(CH$_2$)$_{10}$OCOCH=CH$_2$,
C$_2$F$_5$SO$_2$N(C$_2$H$_5$)CH$_2$CH$_2$OCOC(CH$_3$)CH$_2$,
C$_8$F$_{17}$SO$_2$N(CH$_3$)(CH$_2$)$_4$OCOCH=CH$_2$,
C$_2$F$_5$SO$_2$N(C$_3$H$_7$)CH$_2$CH$_2$OCOC(CH$_3$)=CH$_2$,
C$_2$F$_5$SO$_2$N(C$_2$H$_5$)C(C$_2$H$_5$)HCH$_2$OCOCH=CH$_2$ and the like.

The polymer portion, which is compatible with unsaturated polyester resin or vinyl ester resin, of the fluorine-containing block copolymer to be used in the present invention is a polymer of at least one vinyl monomer selected from the group consisting of methacrylic acid ester; acrylic acid ester; fatty acid vinyl ester; aromatic vinyl monomer; amide group-, hydroxyl group- or carboxylic acid group-containing vinyl monomer; butadiene; vinyl chloride; vinylidene chloride; methacrylonitrile; acrylonitrile; fumaric acid diester; maleic anhydride; dodecylsuccinic anhydride; methallyl glycidyl ether; allyl glycidyl ether; and the like.

As the vinyl monomer, there can be used, for example, lower alkyl(meth)acrylates (in the specification and claims, the term "(meth)acrylic acid" means acrylic acid and methacrylic acid), such as methyl(meth)acrylate, ethyl(meth)acrylate, n-propyl(meth)acrylate, iso-propyl(meth)acrylate, glycidyl(meth)acrylate and the like; higher alkyl(meth)acrylates, such as n-butyl(meth)acrylate, isobutyl(meth)acrylate, tert.-butyl(meth)acrylate, n-hexyl(meth)acrylate, cyclohexyl(meth)acrylate, 2-ethylhexyl(meth)acrylate, octyl(meth)acrylate, lauryl(meth)acrylate, stearyl(meth)acrylate and the like; lower fatty acid vinyl esters, such as vinyl acetate, vinyl propionate and the like; higher fatty acid vinyl esters, such as vinyl butyrate, vinyl caproate, vinyl stearate and the like; aromatic vinyl monomers, such as styrene, vinyltoluene, vinylpyrrolidone and the like; amido group-containing vinyl monomers, such as (meth)acrylamide, N-methylol(meth)acrylamide, N-methoxylmethyl(meth)acrylamide and the like; hydroxyl group-containing vinyl monomers, such as hydroxyethyl(meth)acrylate, hydroxypropyl(meth)acrylate, allyl alcohol and the like; carboxylic acid group-containing vinyl monomers, such as (meth)acrylic acid, itaconic acid, crotonic acid, fumaric acid, maleic acid and the like; butadiene; vinyl chloride; vinylidene chloride; (meth)acrylonitrile; fumaric acid diesters, such as dibutyl fumarate, diisopropyl fumarate and the like; maleic anhydride; dodecylsuccinic anhydride; (meth)allyl glycidyl ether; and the like.

The fluorine-containing block copolymer of the present invention is produced by a two stage polymerization in the presence of, for example, a polymeric peroxide used as an initiator. That is, at least one of the vinyl monomers capable of being formed into a polymer compatible with unsaturated polyester resin or vinyl ester resin, is polymerized in the presence of a polymeric peroxide:

$$+C(CH_2O)_4CO(C_2H_4O)_3C(CH_2)_4COO+_{10}- \quad (VII)$$

In this case, the polymerization is stopped so as to leave about 50% of the active oxygen of the polymeric peroxide in the polymerization system, whereby a polymer containing peroxy bonds can be obtained. When at least one of fluorine-containing vinyl monomers is polymerized in the presence of the above obtained peroxy bond-containing polymer used as an initiator, a block copolymer of the present invention, which consists of a polymer portion having fluorine-containing groups and a polymer portion compatible with unsaturated polyester resin or vinyl ester resin, can be obtained.

A method for producing a cured unsaturated polyester resin or vinyl ester resin containing fluorine-containing groups oriented on the cured resin surface in the present invention will be explained.

An unsaturated polyester resin or vinyl ester resin is mixed with the above described fluorine-containing block copolymer, and the resulting mixture is cured in the presence of a curing agent of a radical initiator, for example, an organic peroxide. However, the surface of the resin, on which the fluorine-containing groups are oriented, must be contacted with air or a fluorine-containing polymer.

The addition amount of the fluorine-containing block copolymer to the unsaturated polyester resin or vinyl ester resin is not particularly important. However, the addition amount must be at least 0.05% by weight based on the amount of the resin in order to orient the fluorine-containing groups on the resin surface, and must be at least 0.1% by weight based on the amount of the resin in order to give sufficiently high water and oil repellencies to the resin surface.

When the fluorine-containing block copolymer contains a functional group, such as epoxy group, hydroxyl group or the like; in its polymer portion compatible with unsaturated polyester resin or vinyl ester resin, a crosslinking agent, such as polyamine, amide, amino resin, polycarboxylic acid, polyisocyanate or the like, which reacts with these functional groups to form a crosslinkage between the functional group and the crosslinking agent, is added to the mixture of an unsaturated polyester resin or vinyl ester resin with the fluorine-containing block copolymer, and the resulting mixture is cured to crosslink the unsaturated polyester resin or vinyl ester resin with the polymer portion compatible with the resin through the crosslinking agent concurrently with the curing of the resin by an organic peroxide, whereby interpenetrating polymer networks (IPN) may be formed.

When the IPN is formed in a cured unsaturated polyester resin or vinyl ester resin, the properties, which have been obtained in the cured resin by orienting the fluorine-containing block copolymer on the cured resin surface, is maintained for a period of time longer than the case wherein the IPN is not formed.

The cured unsaturated polyester resin or vinyl ester resin containing fluorine-containing groups oriented on its surface according to the present invention has remarkably high water repellency and oil repellency due to the presence of the fluorine-containing groups oriented on the resin surface.

As the result, the cured unsaturated polyester resin or vinyl ester resin has remarkably improved water resistance, weather resistance, stain resistance, anti-block property and the like.

Furthermore, the durable time of these effects is remarkably improved by crosslinking the fluorine-containing block copolymer with the cured unsaturated polyester resin or vinyl ester resin as described above.

The present invention will be explained in more detail referring to the following Examples and Comparative examples.

EXAMPLES 1-8, AND COMPARATIVE EXAMPLES 1 AND 2

A mixture of 100 g of an unsaturated polyester resin (trademark: Epolac G110AL, sold by Nippon Shokubai Kagaku Kogyo Co., Ltd.) with a fluorine-containing block copolymer in an amount of 0.05 g (Example 1), 0.1 g (Example 2), 0.5 g (Example 3), 1.0 g (Examples 4 and 8, and Comparative example 2), 2.0 g (Example 5), 5.0 g (Example 6) or 10.0 g (Example 7), or 100 g of the resin alone (Comparative example 1) was cured at room temperature in the presence of 1 g of methyl ethyl ketone peroxide and 0.3 g of cobalt naphthenate dissolved in styrene in a concentration of 6%.

In Examples 1-7 and Comparative example 1, the curing was carried out by using a mold made of a fluorine-containing polymer (trademark: Teflon, sold by E. I. du Pont de Nemours & Co., Inc.); and in Comparative example 2, the curing was carried out by using a mold made of iron.

In Example 8, the curing was carried in a mold made of iron, one face of which had been opened so as to contact the resin mixture with air.

The fluorine-containing block copolymer used in this experiment is an AB type block copolymer consisting of a polymer portion compatible with the unsaturated polyester resin, which polymer portion is a polymer obtained from 60% by weight of methyl methacrylate and 40% by weight of butyl methacrylate and having a number average molecular weight of 15,000, and a polymer portion having fluorine-containing groups, which polymer portion is a polymer obtained by polymerizing

and having a number average molecular weight of 20,000.

The concentration of carbon ($C_{IS}$), oxygen ($O_{IS}$) and fluorine ($F_{IS}$) atoms on the surface of the above obtained cured resins were measured by an X-ray photoelectron spectroscopy (XPS).

The contact angles of the cured resins with water and n-dodecane were measured.

The obtained results are shown in Table 1.

In Examples 1-7 shown in Table 1, fluorine atom is detected on the surface of the cured unsaturated polyester resin, which has been produced by adding a fluorine-containing block copolymer to an unsaturated polyester resin and curing the mixture of a Teflon mold. Moreover, the cured resin has a large contact angles with water and n-dodecane. However, the cured resin containing 0.05% of the fluorine-containing block copolymer in Example 1 has not so large contact angle as compared with the cured resin containing no fluorine-containing block copolymer in Comparative example 1. On the contrary, the cured resin containing 0.1% of the fluorine-containing block copolymer in Example 2 has a very large contact angle. This illustrates that the addition amount of the fluorine-containing block copolymer to the resin is preferably at least 0.1%.

When the addition amount of the fluorine-containing block copolymer is increased, the concentration of fluorine atom on the surface of the cured resin is increased, and hence the cured resin has large contact angles with water and n-dodecane. However, it can be seen from a comparison in the contact angle of the addition amount of 5.0% (Example 6) with the addition amount of 10.0% (Example 7) that the effect of the fluorine-containing block copolymer does not so increase corresponding to the increase of the addition amount in the case whre the addition amount is larger than 5.0%. Therefore, the addition amount of the fluorine-containing block copolymer is preferably not larger than 5.0%.

Even when a mixture of 100 g of an unsaturated polyester resin with 1.0 g of a fluorine-containing block copolymer is used, if the mixture is cured in an iron mold, the concentration of fluorine atoms oriented on the cured resin surface is 2% (Comparative example 2), which is lower than the concentration of 30% of fluorine atoms oriented on the cured resin surface in the case where the mixture is cured in a Teflon mold (Example 4). Therefore, it is clear that the orientating property of fluorine atoms on the cured resin surface in an iron mold is inferior to that in a Teflon mold.

However, when the mixture is cured while contacting the mixture with air (Example 8), the cured resin surface has a concentration of fluorine atoms oriented thereon and a contact angle equal to those in the case where the mixture in cured in a Teflon mold (Example 4).

The cured unsaturated polyester resin containing fluorine-containing groups oriented on its surface has large contact angles with water and n-dodecane, and therefore the cured resin is not easily stained with aqueous and oily staining substances.

EXAMPLES 9 AND 10, AND COMPARATIVE EXAMPLE 3

A cured unsaturated polyester resin (Example 9) was produced in the exact same manner as described in Example 4, except using a fluorine-containing block copolymer of an AB type block copolymer consisting of a polymer portion compatible with unsaturated polyester resin or vinyl ester resin, which polymer portion was a polymer obtained from 54% by weight of methyl methacrylate, 30% by weight of butyl acrylate, 15% by weight of 2-hydroxyethyl methacrylate and 1% by weight of acrylic acid and having a number average molecular weight of 23,000, and a polymer portion having fluorine-containing groups, which polymer portion was a polymer obtained by polymerizing $$CH_2=CHCOOCH_2CH_2(CF_2)_7CF_3$$

and having a number average molecular weight of 30,000.

A cured unsaturated polyester resin (Example 10) was produced in the exact same manner as described in Example 9, except that a curing was effected in the presence of a mixture of 0.21 g of a trimer of hexamethylene diisocyanate and 0.001 g of tin chloride.

A cured unsaturated polyester resin (Comparative example 3) was produced in the exact same manner as described in Comparative example 1.

In these Examples 9 and 10 and Comparative example 3, a cured resin having a dimension of 3 mm×50 mm×50 mm was produced by using a closed type Teflon mold.

The contact angles of the resulting cured resins with water and n-dodecane and the boiling water absorption thereof were measured.

The boiling water absorption was measured in the following manner. Into a separable flask of 2 l capacity equipped with a reflux condenser was charged 1 l of pure water, and the flask was placed in an oil bath to boil the water. The above described 3 kinds of cured resins were immersed in the boiling water. Every given period of time, the cured resin impregnated with water was taken out from the boiling water, and after the water adhered to the cured resin surface was removed, the weight of the impregnated cured resin was measured. The boiling water absorption of the cured resin was expressed by the percentage of the weight increase of the resin based on the weight of the resin before the immersion.

The obtained results are shown in Table 2.

It can be seen from Table 2 that the cured resins of Examples 9 and 10 are remarkably larger in the contact angles with water and n-dodecane than the cured resin of Comparative example 3. This shows that the fluorine-containing groups are oriented on the cured resin surface.

The cured resins of Examples 9 and 10 are small in the weight increase in boiling water and that of Comparative example 3 is large in the weight increase. Therefore, it is clear that, when fluorine-containing groups are oriented on a cured resin surface, the resin surface has a water repellency and prevents water from being penetrated into the interior of the resin.

Further, the cured resin of Example 10 is smaller in the weight increase with the lapse of time than the cured resin of Example 9. This is probably due to the reason that the hydroxyl groups contained in the polymer portion compatible with the unsaturated polyester resin are crosslinked with the resin through the trimer of hexamethylene diisocyanate to form an IPN together with the cured unsaturated polyester resin, whereby the effect of the fluorine-containing groups is maintained for a long a period of time.

However, the cured resin of Example 9 is somewhat larger in the weight increase in boiling water with the lapse of time. This is probably due to the reason that the molecular motions of the fluorine-containing block copolymer and the unsaturated polyester resin become active at the temperature of boiling water, and the fluorine-containing block copolymer is split from the cured unsaturated polyester resin, and hence the cured resin becomes poor in the water repellency and absorbs water, resulting in the large weight increase with the lapse of time.

TABLE 1

|  | Addition amount of fluorine-containing block copolymer (%) | Material of mold | Concentration of atoms on the resin surface (%) | | | Contact angle (degree) | |
|---|---|---|---|---|---|---|---|
|  |  |  | $F_{1S}$ | $C_{1S}$ | $O_{1S}$ | Water | n-Dodecane |
| Example 1 | 0.05 | Teflon | 5 | 54 | 41 | 72 | 36 |
| Example 2 | 0.1 | Teflon | 10 | 67 | 23 | 98 | 52 |
| Example 3 | 0.5 | Teflon | 15 | 64 | 21 | 105 | 59 |
| Example 4 | 1.0 | Teflon | 30 | 52 | 18 | 112 | 63 |
| Example 5 | 2.0 | Teflon | 42 | 45 | 13 | 113 | 65 |
| Example 6 | 5.0 | Teflon | 44 | 44 | 12 | 115 | 69 |
| Example 7 | 10.0 | Teflon | 47 | 42 | 11 | 115 | 70 |
| Example 8 | 1.0 | air | 31 | 52 | 17 | 115 | 62 |
| Comparative example 1 | 0.0 | Teflon | 0 | 54 | 46 | 60 | 20 |
| Comparative example 2 | 1.0 | iron | 2 | 56 | 42 | 61 | 21 |

TABLE 2

|  | Addition amount of fluorine-containing block copolymer (%) | Contact angle (degree) | | Weight increase in boiling water (%) | | |
|---|---|---|---|---|---|---|
|  |  | Water | n-Dodecane | after 1 day | after 2 days | after 4 days |
| Example 9 | 1.0 | 110 | 61 | +2.0 | +2.3 | +2.7 |
| Example 10 | 1.0 | 109 | 61 | +1.9 | +2.2 | +2.3 |

TABLE 2-continued

| | Addition amount of fluorine-containing block copolymer (%) | Contact angle (degree) | | Weight increase in boiling water (%) | | |
|---|---|---|---|---|---|---|
| | | Water | n-Dodecane | after 1 day | after 2 days | after 4 days |
| Comparative example 3 | 0.0 | 60 | 18 | +3.0 | +3.6 | +4.5 |

EXAMPLE 11 AND COMPARATIVE EXAMPLE 4

A cured vinyl ester resin (Example 11) was produced in the exact same manner as described in Example 4, except that a vinyl ester resin (trademark: Ripoxy R-802, sold by Showa High Polymer Co., Ltd.) was used in place of the unsaturated polyester resin.

A cured vinyl ester resin (Comparative example 4) was produced in the exact same manner as described in Comparative example 1, except that the above described vinyl ester resin was used in place of the unsaturated polyester resin.

The contact angles of the resulting cured resins with water and n-dodecane are shown in the following Table 3.

TABLE 3

| | Addition amount of fluorine-containing block copolymer (%) | Contact angle (degree) | |
|---|---|---|---|
| | | Water | n-Dodecane |
| Example 11 | 1.0 | 121 | 78 |
| Comparative example 4 | 0.0 | 63 | 31 |

It can be seen from Table 3 that, when a vinyl ester resin is cured together with a block copolymer consisting of a polymer portion compatible with the vinyl ester resin and a polymer portion having fluorine-containing groups, the fluorine-containing groups are oriented on the cured resin surface, and the cured resin has a remarkably improved water and oil repellencies, similar to the case of cured unsaturated polyester resin.

EXAMPLE 12

A cured unsaturated polyester resin was produced in the exact same manner as described in Example 4, except that a block copolymer consisting of a polymer portion, which consisted of polymethyl methacrylate and had a number average molecular weight of 12,000, and a polymer portion, which was a polymer of $C_{12}F_{25}CH_2CH_2OOCH=CH_2$ and had a number average molecular weight of 8,100, was used as a fluorine-containing block copolymer.

The cured resin had a contact angle with water of 118 degrees and that with n-dodecane of 67 degrees. These values are remarkably higher than the values (contact angle with water: 60 degrees, and that with a n-dodecane: 20 degrees) of the cured unsaturated polyester resin in Comparative example 1, which did not contain a fluorine-containing block copolymer. That is, the cured resin of Example 12 is remarkably higher in water and oil repellencies than the cured resin of Comparative example 1. It is clear that the high water and oil repellencies are due to the effect of the fluorine-containing groups oriented on the cured resin surface.

EXAMPLE 13 AND COMPARATIVE EXAMPLE 5

A mixture of 100 g of an unsaturated polyester resin (trademark: Epolac G110AL, sold by Nippon Shokubai Kagaku Kogyo Co., Ltd.), 50 g of calcium carbonate, 1 g of a fluorine-containing block copolymer, 1 g of benzoyl peroxide and 50 g of glass fibers having a length of 4 mm was cured at 80° C. in a Teflon mold (Example 13).

The fluorine-containing block copolymer used in this Example 13 is the same as that used in Example 4.

A cured unsaturated polyester resin (Comparative example 5) was produced in the exact same manner as described in Example 13, except that the fluorine-containing block copolymer was not used.

The contact angles of the resulting cured resins with water and n-dodecane were measured. As the result, it was found that the contact angle with water of the cured resin in Example 13 was 109 degrees, and that of the cured resin in Comparative example 5 was 56 degrees; and the contact angle with n-dodecane of the cured resin in Example 13 was 66 degrees, and that of the cured resin in Comparative example 5 was 21 degrees.

It can be seen from the above obtained result that the present invention is very effective not only in the unsaturated polyester resin or vinyl ester resin alone but also in the mixture of these resins with a reinforcing agent, a filler and other additives, such as glass fibers, calcium carbonate and the like.

It can be clearly understood from the above Examples and Comparative examples that, when an unsaturated polyester resin or vinyl ester resin is cured together with a block copolymer consisting of a polymer portion having fluorine-containing groups and a polymer portion compatible with the unsaturated polyester resin or vinyl ester resin, the fluorine-containing groups are oriented on the surface of the cured unsaturated polyester resin or vinyl ester resin, and the cured resins have remarkably high water and oil repellencies.

This effect does not change even in the case where the cured resin is immersed in boiling water, and therefore the cured resin has a very low boiling water absorption. Moreover, this effect does not deteriorate at all even when the resin is used together with additives, such as reinforcing agents, fillers and the like.

The duration time of the effect of the fluorine-containing block copolymer oriented on the cured resin surface becomes substantially longer by reacting the fluorine-containing block copolymer with a crosslinking agent to form a crosslinked structure between the block copolymer and the cured resin.

The cured resin according to the present invention has high water and oil repellencies, and therefore it is clear that the cured resin is excellent in water resistance, weather resistance, stain resistance and anti-block property.

On the contrary, the cured resin not containing a fluorine-containing block copolymer, which are illustrated in the Comparative examples, are low in water and oil repellencies, are high in boiling water absorption, and are distinctly inferior to the cured resin of the present invention in water resistance, weather resistance, stain resistance and anti-block property.

What is claimed is:

1. A cured unsaturated polyester resin or vinyl ester resin containing fluorine-containing groups oriented on its surface, comprising an unsaturated polyester resin or vinyl ester resin and a block copolymer, said block copolymer consisting essentially of a polymer portion of at least one fluorine-containing vinyl monomer and a polymer portion compatible with the unsaturated polyester resin or vinyl ester resin of at least one vinyl monomer selected from the group consisting of methacrylic acid ester, acrylic acid ester, fatty acid vinyl ester, aromatic vinyl monomer, amide group-containing vinyl monomer, hydroxyl group-containing vinyl monomer, carboxylic acid group-containing vinyl monomer, methacrylonitrile, acrylonitrile, fumaric acid diester, maleic anhydride, methallyl glycidyl ether and allyl glycidyl ether, said block copolymer being present in amounts of at least 0.05% by weight based on the amount of resin, and wherein the cured unsaturated polyester resin or vinyl ester resin is obtained by curing said unsaturated polyester resin or vinyl ester resin with said block copolymer.

2. A cured unsaturated polyester resin or vinyl ester resin according to claim 1, wherein said at least one fluorine-containing vinyl monomer has the following formulae (I)–(VI), which are:

a fluorine-containing vinyl monomer having the formula (I)

$$CH_2=CR_1COOR_2R_{f1} \tag{I}$$

wherein $R_1$ represents a hydrogen atom or a $-CH_3$ group, $R_2$ represents a straight chain or branched $-C_mH_{2m}-$ group; wherein m is a positive integer of 1–10, and $R_{f1}$ represents a $-C_nF_{2n+1}$ or $-C_nF_{2n-1}$ group; wherein n is a positive integer of 1–16, a fluorine-containing vinyl monomer having the formula (II)

$$CH_2=CR_1COOR_3R_4 \tag{II}$$

wherein $R_1$ has the same meaning as in the formula (I), $R_3$ represents a $-C_kH_{2k}-(CH_2CH_2O)_l-$ group; wherein k is 0 or a positive integer of 1–10, and l is a positive integer of 1–10, and $R_4$ represents a $-C_pH_{2p}C_qF_{2q}H$ group; wherein p is 0 or a positive integer of 1–10, and q is a positive integer of 1–10, a fluorine-containing vinyl monomer having the formula (III)

$$CH_2=CR_1COOR_2R_{f2} \tag{III}$$

wherein $R_1$ and $R_2$ have the same meanings as in the formula (I), and $R_{f2}$ represents a $-C_rF_{2r-2}H$, $-C_rF_{2r+1}$ or $-C_2F_{2r}H$ group; wherein r is a positive integer of 1–10, a fluorine-containing vinyl monomer having the formula (IV)

$$CH_2=CR_5COOR_6 \tag{IV}$$

wherein $R_5$ represents a fluorine atom or a $-CHF_2$, $-CH_2F$, $-CF_3$, $-OCOCH_2F$ or $-OCOCHF_2$ group, and $R_6$ represents a $-C_nH_{2n+1}$, $-C_nH_{2n}F$, $-C_nF_{2n+1}$ or $-C_nF_{2n}H$ group; wherein n is a positive integer of 1–16, a fluorine-containing vinyl monomer having the formula (V)

$$CH_2=CR_1COOR_2\underset{\underset{R_7}{|}}{N}COR_{f1} \tag{V}$$

wherein $R_1$, $R_2$ and $R_{f1}$ have the same meanings as in the formula (I), and $R_7$ represents a $-C_mH_{2m+1}$ group; wherein m is a positive integer of 1–10, and a fluorine-containing vinyl monomer having the formula (VI)

$$CH_2=CR_1COOR_2\underset{\underset{R_7}{|}}{N}SO_2R_{f1} \tag{VI}$$

wherein $R_1$, $R_2$ and $R_{f1}$ have the same meanings as in the formula (I) and $R_7$ has the same meaning as in the formula (V).

3. A cured unsaturated polyester resin or vinyl ester resin according claim 1, which is crosslinked with said block copolymer in the polymer portion compatible with unsaturated polyester resin or vinyl ester resin.

* * * * *